Oct. 10, 1961  D. S. GREY  3,003,407
COMBINED RANGE FINDER AND VIEW FINDER
Filed Oct. 8, 1956  4 Sheets-Sheet 1

INVENTOR.
David S. Grey
BY
Brown and Mikulka
ATTORNEYS

Oct. 10, 1961 D. S. GREY 3,003,407
COMBINED RANGE FINDER AND VIEW FINDER
Filed Oct. 8, 1956 4 Sheets-Sheet 2
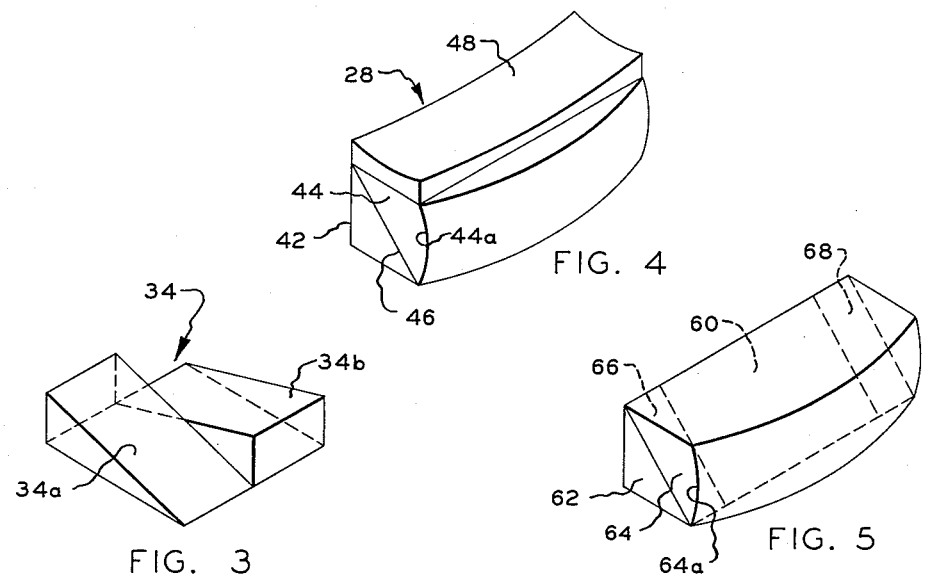
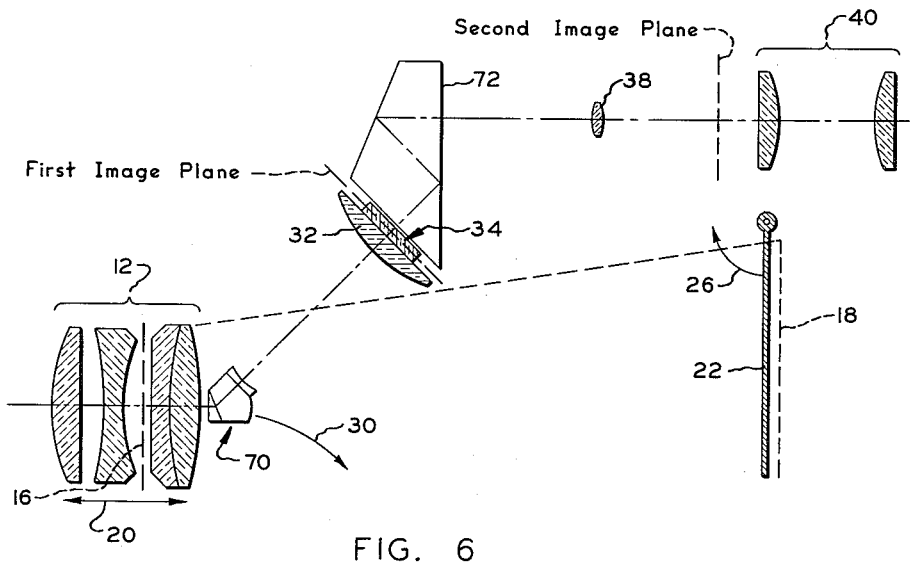
INVENTOR.
David S. Grey
BY
Brown and Mikulka
ATTORNEYS United States Patent Office 3,003,407
Patented Oct. 10, 1961

3,003,407
COMBINED RANGE FINDER AND VIEW FINDER
David S. Grey, Weston, Mass., assignor to Polaroid Corporation, Cambridge, Mass., a corporation of Delaware
Filed Oct. 8, 1956, Ser. No. 614,716
15 Claims. (Cl. 95—44)

The present invention relates to a range finder and a view finder for use in a photographic camera and more particularly to a combined range finder and view finder which employs the objective lens of the camera for ranging and view finding, in addition to its imaging function relative to the photographic exposure.

Various advantages are known to accrue to the employment of the camera objective in view finding systems, said systems being generally either of a reflex type or one in which viewing occurs along an eye-level axis which is an optical image of the axis of the objective, either coincident with or laterally displaced with respect to that of the objective. One principal benefit identified with this type of view finder is avoidance of the need of correcting for parallax, there being provided for viewing purposes an accurate image of the photographic subject. Furthermore, where the entrance pupil of the range and view finder system is identified with the camera objective rather than with a separate finder objective the same overlap of foreground with background objects occurs in said system as in the photographic image. In addition, a positive and accurate framing of the field, irrespective of frontal attachments or of the focal setting of the camera objective is achieved.

Use has been made of the camera objective, or of a special objective, in a so-called split-field range finding system combined with a view finding system wherein the central area of the objective is employed for imaging the view finder field and marginal areas of the objective are used for imaging the range finder field. However, systems of the last-mentioned type have, it is believed, only found application relative to small cameras, namely, cameras of the type employing 35 mm. film, said systems being entirely unsuitable for incorporation with larger cameras such as those providing an image diagonal greater than approximately three inches.

In another known finder system, the image formed by the camera objective is deflected by a mirror to a position such that it can be viewed by a magnifier, either simple or compound. In a camera which employs a small image area, it is feasible to follow this procedure but if the image area has a diagonal dimension larger than approximately three inches, the necessity for providing an image to be viewed by the magnifier, together with the requirement for a magnifier so constructed as to collect light from this image necessitates an unwieldy, bulky and costly system, especially if such a system is of an eye-level type. The same considerations also apply, perhaps even more strongly, to other known systems which employ an auxiliary finder lens of the same focal length as the camera objective instead of said objective. The present invention is concerned with the provision of a compact, relatively simple and moderately priced combined range and view finder system, utilizing the camera objective and adapted to incorporation with cameras of the larger type, hereinbefore mentioned.

An important feature of the present invention is the construction in which an auxiliary or complementary positive lens or its optical equivalent is inserted behind the camera objective which, in combination with said camera objective, forms, in effect, a lens of short focal length. Hence, the angular field of the camera objective is imaged within a small area. There are two principal variations of this arrangement as follows:

In one arrangement, a single auxiliary positive lens or objective is employed, the positive lens being positioned behind the camera objective and dimensioned to cover an area which is generally coextensive with a strip-like area extending substantially across the objective aperture thus permitting the use of light which passes through the edges or marginal areas of said aperture for range finding purposes.

Another arrangement employs two or more auxiliary objective lenses having individual optical axes and being behind the camera objective, the separate axes being subsequently combined by suitable light-deviating means, such as optical wedges or reflecting means, so that they have substantially coincident image planes. The separation between the apertures of the auxiliary objectives permits acceptance of light from marginal portions of the camera objective and, accordingly, permits accurate ranging.

One object of the invention is to provide a novel and efficient combined split-field range finder and view finder system for a larger type camera in which the camera objective is employed as a component of the system and in which focusing of the photographic image and of the ranging and view finder images is obtained simultaneously through movement of the objective along its axis to a correct position.

Another object is to provide and arrange a plurality of reflecting and refracting optical components of given characteristics in combination with a camera objective of relatively large image diagonal so that light rays passing through the central area of the objective are used in forming view finder image portions and light rays passing through marginal areas of the objective are employed in forming ranging image portions.

A further object is to provide a range and view finder system in a form wherein light-deviating and imaging components may readily be moved into, operated within, and withdrawn from the area defined by the angle of view of the objective which is used for making the photographic exposure.

Other objects are to provide systems of the character described employing novel combinations of optical components which result in improved imaging accuracy, desired image magnification and reduction, contrast between ranging and view finding image areas, and correction for spherical and chromatic aberration; to provide an eye-level range and view finding system wherein erect images having unreversed left and right image portions are produced and can be seen through a single viewing aperture; and to provide a system in which photosensitive materials positioned in the focal plane of the camera are safeguarded from unwanted actinic light during operation of the ranging and view finding components.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a diagrammatic view, in perspective, of the optical wedge means of FIG. 1;

FIG. 4 is a diagrammatic view, in perspective, of a light-deviating and image-forming component of FIG. 1;

FIG. 5 is a diagrammatic view, in perspective, of a modification of the optical component of FIG. 4;

FIG. 6 is a diagrammatic side-elevational view, in section, showing a modification of the combined range and view finder optical system of FIG. 1;

Figure 1:
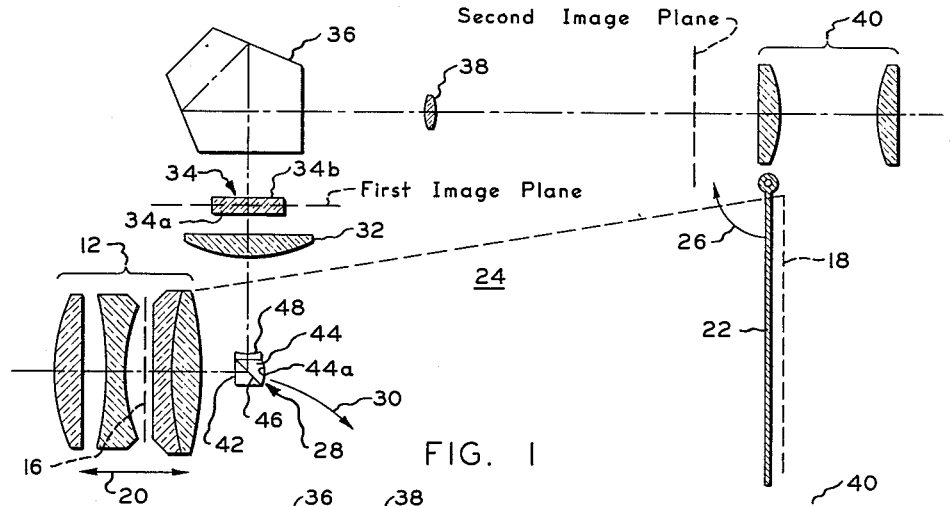
FIGURE 1 is a side-elevational view, in section, illustrating diagrammatically a combined range and view finder optical system of the present invention.
Figure 2:
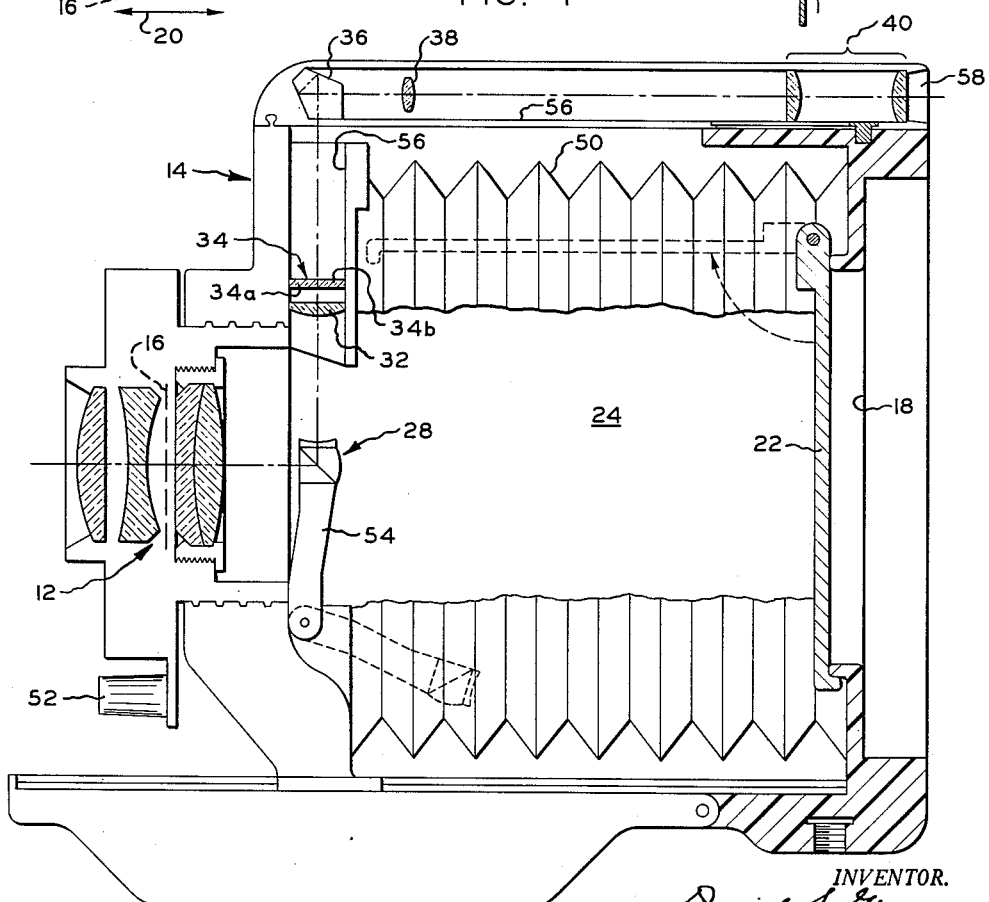
FIG. 2 is a diagrammatic, side-elevational view, partly in section, of a camera showing incorporation of the system of FIG. 1 therein.

Referring to FIG. 1, a combined range and view finding system of the invention is shown which incorporates the picture "taking" objective lens 12 of a camera 14, the camera being shown more fully in FIG. 2. The objective lens 12, or a component thereof, is movable toward and away from focal plane 18 by conventional means, not shown, as indicated by the double-headed arrow 20. Camera 14 has, for example, a between-the-lens shutter and an iris diaphragm, not shown, positioned at location line 16, and a focal plane 18, the latter being the image plane of objective 12 which is used for positioning and photographically exposing a photosensitive film. It is to be assumed that camera 14 is of a type larger than a so-called "miniature" camera. A light lock 22 is mounted for positioning within and withdrawal from the area 24 defined by the angle of view of objective 12. The light lock, at the closed position shown, serves to shield from actinic light a film, not shown, which would normally be positioned for exposure at plane 18 when the range and view finding system is being used preparatory to said exposure. The light lock is pivoted away from its light intercepting position when a photographic exposure is about to be made, as indicated by arrow 26. Other components of the combined range and view finding system comprise a composite light-deviating and image-forming element 28, movable, as indicated by arrow 30, in and out of area 24, as for example, by pivotal or slidable mounting means, such as the pivotal means shown in FIG. 2, a field lens 32, ranging wedge means 34 composed of wedges 34a and 34b shown in detail in FIG. 3, prism 36, relay lens 38 and eyepiece 40. Composite element 28 is composed of prism components 42 and 44 bonded together and having an intervening, semi-transparent, reflecting surface 46. Prism component 44 is provided with an image-forming, concave, spherical, specularly-reflecting surface 44a. A negative lens element 48 is bonded to the upper planar surface of component 44, as shown in greater detail in FIG. 4.

Operation of the system is substantially as follows. Assuming light lock 22 to be closed and composite element 28 to be positioned as shown, the iris diaphragm to be open to its maximum diameter and the shutter to be open, light from the field of view which includes an object to be ranged is admitted to the combined range and view finding system. The image-forming light rays from the objective and incident upon composite element 28 are transmitted by prism component 42, semi-reflecting surface 46 and component 44 to concave reflecting surface 44a, whence they are returned through component 44 to surface 46, are reflected upwardly therefrom through lens component 48 and pass through field lens 32 to the first image plane. The objective 12, or a component thereof, is moved axially to establish, in conjunction with concave image-forming mirror 44a operating as an auxiliary or complementary objective, correct focus relative to the first image plane. The concave mirror 44a in conjunction with negative lens 48 provides correction for spherical and chromatic aberration, said correction being of importance if ranging is to be accurate.

The system has an exit pupil defined, for example, by the image of the relay lens 38, and three distinct entrance pupils each of which pertains to a separate portion of the field of view. The principal entrance pupil lies at or near the center of composite element 28 and is conjugate to said exit pupil for light from the field of view which passes outside the area defined by the deviating wedges 34a and 34b which are used for ranging. The two other entrance pupils located at each side of the central entrance pupil, are conjugate to the exit pupil for light which passes through the respective ranging wedges.

The deviating wedges 34a and 34b are located in the first image plane of the system composed of the camera objective 12, the composite element 28 and field lens 32, said image plane having been established with the objective 12 set for an object at infinite distance. The deviating wedges provide a discontinuity of light deviation in said image plane along the line of junction of the two wedges. Hence, there is a discontinuity of entrance pupil pertaining to the individual areas covered by each of the wedges. In other words, there is a deviational discontinuity to incident light. If objective 12 is adjusted to focus an object located at a finite distance and if the focus is correct, the image of the object will be formed at said first image plane and the object image portions, because they are focused at said plane, will be deviated in coincidence by the wedges and will provide alignment of split-field areas. If the image of the object is not formed at said first image plane the wedges will deviate the light rays from the object but they will not be in coincidence and the split-field image portions of said object will not be aligned. This occurs because a wedge at an image plane will not shift the apparent position of the image, but a wedge outside the image plane will shift said apparent position of the image. It will be understood that correct alignment of the split-field object image portions implies correct imaging of the object at the focal plane of the camera. When the camera is focused, the film plane, the composite element 28, the field lens 32 and the wedges 34a and 34b are kept in fixed relation to each other to insure operation of the system.

Images of the field of view and of the object formed at the first image plane are twice reflected by prism 36, which may appropriately be a penta prism, and are relayed by relay lens 38 to the second image plane for observation by eyepiece 40. Camera lens 12, field lens 32, relay lens 38 and eyepiece 40 constitute, in effect, a terrestrial telescope. The four reflections which occur in elements 28 and 36 are mutually compensating for inversion thus insuring an erect image.

In operating the combined range and view finder of the invention relative to making a photographic exposure, it is assumed that, preliminarily, the camera iris diaphragm at 16 is completely open, the shutter at 16 is open, the light lock 26 is closed and the composite element 28, or other type of auxiliary objective to be described below, is located immediately behind the camera objective. A workable operational sequence for making the photographic exposure would be as follows: The shutter closes; the diaphragm assumes a preset opening value; composite element 28 is removed from the exposure area; the light lock closes; and the shutter opens and closes. A focal plane shutter, not shown, could also be employed and would probably obviate the necessity of providing the light lock.

The combined range and view finder system of FIG. 1 is shown in FIG. 2 incorporated with a camera of a folding type having a bellows 50. The camera objective lens 12 is moved axially by an adjusting knob 52 which, when moved arcuately, actuates mechanism, not shown, providing translational movement of the lens, or one or more elements thereof, along its axis. The composite light-deviating and imaging element 28 is mounted on a pivotal arm 54 which permits the element to be moved to a position out of the area 24 within the angle of view of the objective, as indicated by the broken line. Other optical elements of the finder system are shown mounted in tubular means 56 having a viewing aperture 58.

A modification of the light-deviating element 28 of FIG. 4 is shown in FIG. 5. The semi-transparent mirror 60, formed at the interface of prism elements 62 and 64, terminates short of the extremities of the element. Clear, light-transmitting marginal areas 66 and 68 are thus located adjacent each extremity. A concave reflecting surface 64a, similar to surface 44a of element 28, is provided. In operation, marginal entering light from the camera objective employed for ranging passes through clear areas 66 and 68 of the prism interface and is convergingly reflected by surface 64a to surface 60 whence it is reflected upward to field lens 32. Light from the central part of the objective forming other areas of the field of view will necessarily have to pass through the semi-transparent reflecting area 60 before being twice reflected by said surfaces 64a and 60 and a portion of the light will thus be absorbed by said area 60. Accordingly, ranging image areas will appear brighter than other areas of the visible image and the heightened contrast thus provided between the image portions permits greater facility in determining the alignment condition of the split-field images during ranging operation. Other possible modifications of element 28 of FIG. 4 include: forming the concave reflecting mirror on the bottom of the element to utilize light which is deviated downwardly from semi-transparent surface 44 thereto; forming said mirror on the rear surface, as shown, and also on the bottom surface to provide increased light for imaging purposes; mounting negative lens 48 on the front surface of element 28, or on both the front and top surfaces.

FIG. 6 illustrates a range and view finding system which operates substantially similarly to that of FIG. 1 but which employs slightly modified components. A light-deviating and imaging element 70 having portions somewhat modified as to their relative size or arrangement but otherwise similar to those of element 28 of FIG. 1 deviates light from objective 12 obliquely upward toward a modified prism 72. A pair of deviating wedges 34 is positioned between a field lens 32 and a face of prism 72, the wedges preferably being bonded to at least one of the elements 72 and 32. Ranging and view finding considerations, adjustability of components, etc., are similar to those described with respect to FIG. 1.

Figure 7:
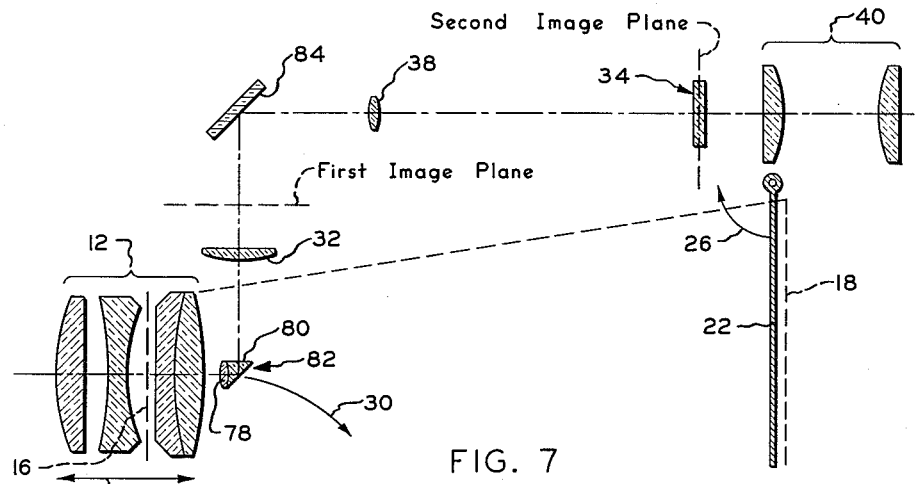
FIG. 7 is a view, similar to that of FIG. 6, of another combined range and view finder optical system of the invention.
Figure 9:
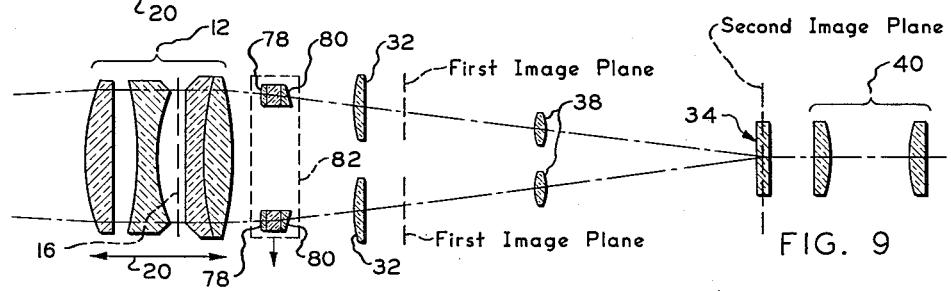
FIG. 9 is a diagrammatic, top plan view, partly in section, of the system of FIG. 7.
Figure 8:
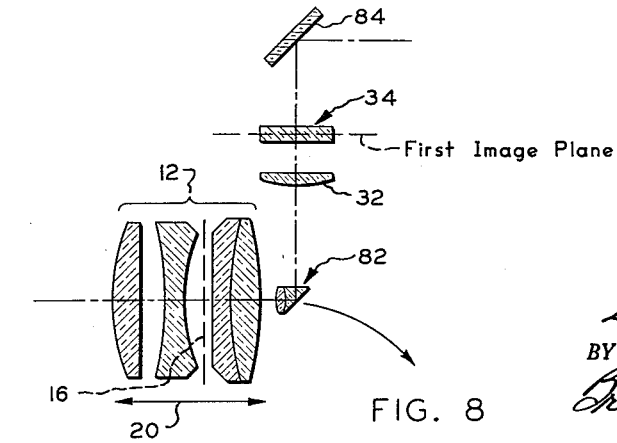
FIG. 8 is a diagrammatic side-elevational view of a modified portion of the optical system of FIG. 7.

The system of FIG. 7 employs a pair of positive auxiliary objective lenses 78 (one shown) combined with prisms or mirrors 80 to form deviating and imaging elements 82. A mirror 84 or a prism having a single reflecting surface is used in place of the twice-reflecting prisms of FIGS. 1 and 6, only one additional reflection being required to provide an erect image in conjunction with the single reflecting surface of element 82. Optical wedges 34, of the type used in the systems above-shown, are located at the second image plane. Other elements of the system are essentially the same as those previously described. In this system the ranging beams are maintained separate until incident upon the second image plane, or approximately at this plane. It is therefore necessary to insure exact alignment of all components between the entrance pupils and the second image plane, or ranging accuracy would be impaired. Decentered lenses may, alternatively, be used in forming the elements 82. The deviating wedges 34 may be located at the first image plane of the system, as shown in FIG. 8, if preferred, or alternatively, they could even be positioned adjacent the auxiliary objectives 78 of elements 82. It will thus be seen that wide latitude is permitted in the placement of wedge components which provides flexibility in the design of the system and in its adaptability to mounting in a camera. A generally similar system to that of FIG. 7 is shown schematically in plan in FIG. 9, mirror surfaces which operate relative to light traveling in a vertical direction being omitted for reasons of clarity.

Figure 10:
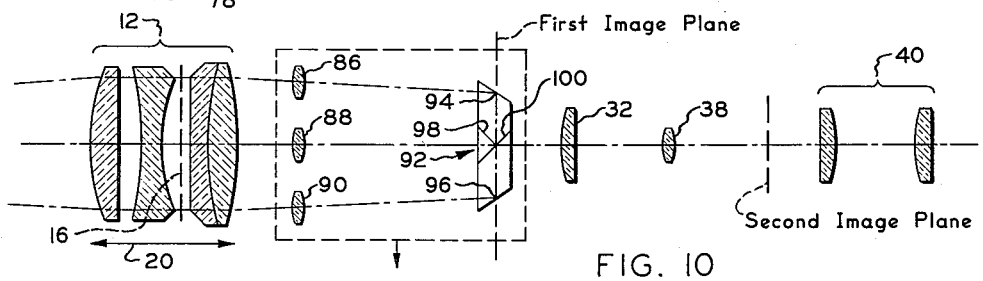
FIG. 10 is a diagrammatic, top plan view, in section, of another combined range and view finder optical system of the invention.
Figure 11:
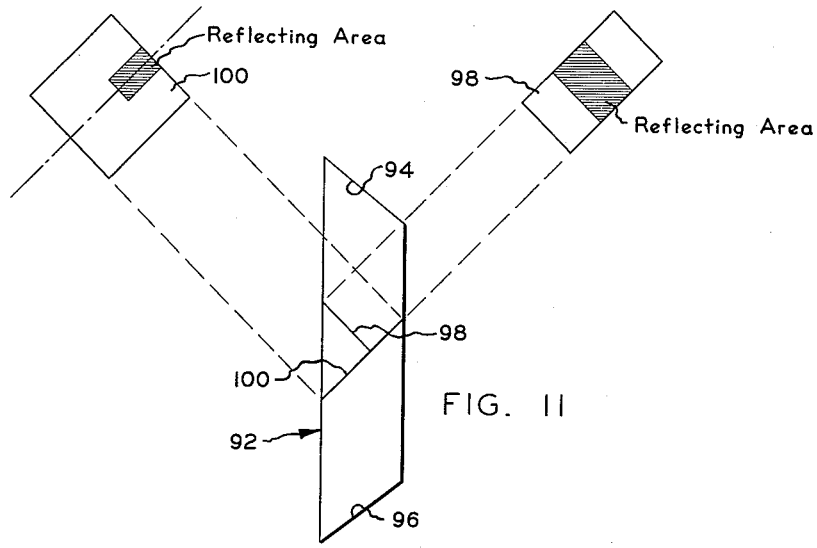
FIG. 11 is a diagrammatic view of the composite light-deviating and image-forming element of FIG. 10 showing surface areas in elevation.

In FIG. 10 a modified system is illustrated which includes three auxiliary positive objectives, 86, 88 and 90, mounted immediately behind the camera objective 12. A composite prism element 92 having reflecting surfaces 94 and 96, and given reflecting areas of surfaces 98 and 100 which are shown in further detail in FIG. 11, is positioned at the first image plane. Reflecting means of the system which operate relative to light traveling in a vertical direction have been omitted for clarity. Auxiliary objective lenses 86 and 90 could, appropriately, have relatively long focal lengths while auxiliary objective lens 88 could have a relatively short focal length. Higher magnification would thereby be produced in the central ranging area than in the rest of the field. This arrangement provides greater ranging accuracy but leaves a gap in the object field between the area presented by the ranging objectives and the area presented by the central objective. Reflecting surfaces 94 and 96 of composite prism 92 are nonparallel with respect to surfaces 98 and 100, said nonparallelism of surfaces serving to deviate light in a manner similar to that of the optical wedges 34 of FIG. 1. Accordingly, element 92 provides deviation of the ranging light rays so that it may be said to constitute the functional equivalent of the deviating wedges 34a and 34b, above described.

Figure 12:
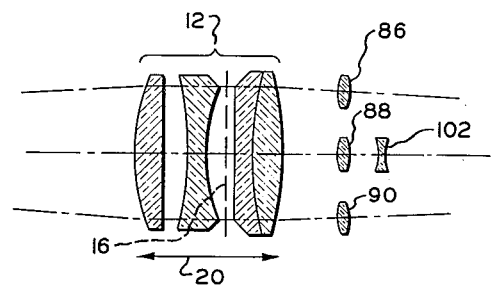
FIG. 12 is a diagrammatic, top plan view of a modification of a portion of the system of FIG. 10.
Figure 13:
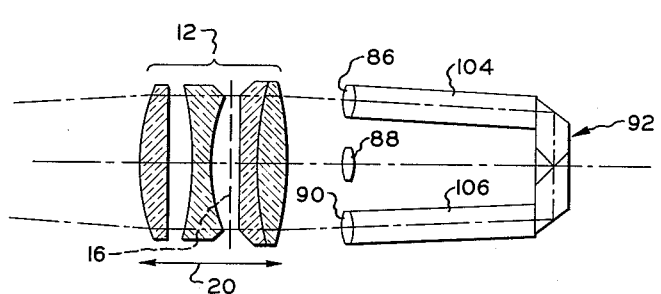
FIG. 13 is a diagrammatic top plan view of another modification of a portion of the system of FIG. 10.

The modification of FIG. 12 illustrates placement of a negative lens 102 in the optical path of light transmitted by the central positive auxiliary objective 88 of FIG. 10. Lens 88, with negative lens 102, constitutes a telephoto lens and, accordingly, the three auxiliary objectives have substantially equal focal lengths. In FIG. 13, an alternate construction is shown for making the focal lengths of all three auxiliary positive objectives, 86, 88 and 90 substantially equal. Glass components 104 and 106 are placed in the optical paths of the outer auxiliary objectives and serve to increase the optical path lengths between said objectives and the first image plane with respect to optical path lengths in air which was shown in FIG. 10. The glass components 104 and 106 are preferably bonded to the auxiliary objectives and to the prism element 92, respectively.

It will be apparent that the systems described herein could be modified in several ways. For example, the deviating wedges could cover the entire field of view; they could be omitted to provide a view finder only; or the area around the deviating wedges could be omitted to provide simply a range finder. In general, the deviating wedges, or the mirrors of prism 92, can be located at either the first or second image planes of the system.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a photographic camera having an axially adjustable objective lens, a combined finder for viewing and ranging a field of view through said lens, said finder comprising composite light-deviating and imaging means located behind said objective lens, said light-deviating and imaging means being substantially coextensive with a predetermined area which extends transversely of the optical axis of and includes opposite marginal portions of said objective lens, said composite light-deviating and imaging means including a first reflecting means for deviating light from said objective lens to one side of the angular field of said lens along a second axis disposed at a predetermined angle with respect to said optical axis and also including first focusing means which, in combination with said objective lens, effectively constitutes lens means of short focal length for focusing an image of the field of view at a first image plane on said second axis, second focusing means located on said second axis adjacent said first image plane, second reflecting means for deviating light transmitted along said second axis to a third axis substantially parallel with said optical axis, third focusing means positioned on said third axis for relaying said image to a second image plane on said third axis, an eyepiece located on said third axis for viewing said second image plane, second light-deviating means comprising at least two adjacent elements disposed at one of said image planes for so splitting the field of said image into separate and adjacent fields which correspond respectively to light coming from each of said marginal portions of said objective lens that said adjacent fields are continuous when said image is coincident with said one of said image planes and are discontinuous when said image is out of coincidence with said one of said image planes, and means for moving at least said composite light-deviating and imaging means outside of the optical path extending between said objective lens and the focal plane of the camera.

2. A combined range finder and view finder according to claim 1, wherein the composite light-deviating and imaging means comprises a semi-reflecting surface and a concave, spherical reflecting surface for reflecting and focusing light coming from said objective lens and through said semi-reflecting surface back to said semi-reflecting surface.

3. A combined range finder and view finder according to claim 1, wherein the composite light-deviating and imaging means comprises a semi-reflecting surface, a concave, spherical reflecting surface for reflecting and focusing light coming from said objective lens and through said semi-reflecting surface back to said semi-reflecting surface, and a negative lens for correcting aberrations in light reflected from said semi-reflecting surface.

4. A combined range finder and view finder according to claim 1, wherein the composite light-deviating and imaging means comprises a positive lens constituting an auxiliary objective with respect to said camera objective, and means for deviating light transmitted by said auxiliary objective.

5. A combined range finder and view finder according to claim 1, wherein the composite light-deviating and imaging means comprises a plurality of positive lenses constituting a plurality of auxiliary objectives with respect to said camera objective, and means for deviating light transmitted by said auxiliary objectives.

6. A combined range finder and view finder according to claim 1, wherein said composite light-deviating and imaging means includes a pair of reflecting surfaces, and wherein said reflecting means for deviating light transmitted along said second axis also includes a pair of reflecting surfaces.

7. A combined range finder and view finder according to claim 1, wherein said second light-deviating means, located at one of said image planes, comprises a pair of optical wedges.

8. A combined range finder and view finder according to claim 1, wherein said second light-deviating means comprises a composite prism element having a plurality of non-parallel surfaces which include given light-reflecting and light-transmitting areas.

9. A combined range finder and view finder according to claim 1, wherein said composite light-deviating and imaging means comprises means for forming an image corrected for spherical aberration.

10. A combined range finder and view finder according to claim 1, wherein said composite light-deviating and imaging means forms two laterally separated image planes at said first image plane, said images being projected for viewing at said second image plane.

11. A combined range finder and view finder according to claim 1, wherein said composite light-deviating and imaging means comprises a semi-reflecting surface, a concave, spherically reflecting surface for reflecting and focusing light coming from said objective lens and through said semi-reflecting surface back to said semi-reflecting surface and a negative lens for correcting aberrations in light reflected from said semi-reflecting surface along said second axis, and wherein said reflecting means for deviating light transmitted along said second axis comprises a penta prism, and wherein the last named light-deviating means comprises a pair of optical wedges.

12. A combined range finder and view finder according to claim 1, wherein said composite light-deviating and imaging means comprises a concave, spherically reflecting surface, a semi-reflecting surface having clear, light-transmitting marginal areas coextensive with said marginal portions of said objective lens, light transmitted through said marginal portions of said objective lens being passed through said light-transmitting marginal areas, being convergingly reflected by said concave surface to said semi-reflecting surface to increase thereby the relative brightness of light transmitted by said marginal portions of said objective lens.

13. A combined range finder and view finder according to claim 1, wherein said composite light-deviating and imaging means comprises a positive lens constituting an auxiliary objective with respect to said camera objective and means for deviating light transmitted by said auxiliary objective, and wherein said reflecting means for deviating light along said second axis comprises a plane mirror, and wherein the last named light-deviating means comprises a pair of optical wedges located at said second image plane.

14. A combined range-finder and view-finder according to claim 1, wherein said composite light-deviating and imaging means comprises at least a pair of positive lenses constituting auxiliary objectives with respect to said camera objective, and a composite prism element having a plurality of non-parallel surfaces which include given light-reflecting and light-transmitting areas, said surfaces constituting said second light-deviating means.

15. A combined range-finder and view-finder according to claim 1, wherein said composite light-deviating and imaging means comprises a pair of positive lenses constituting auxiliary objectives with respect to said camera objective, said auxiliary objectives being located to subtend said marginal portions of said objective lens, and a composite prism element located at the image plane of said auxiliary objective, said composite prism element having a plurality of non-parallel surfaces which include given light-reflecting and light-transmitting areas, said surfaces constituting said second light-deviating means, said combined range-finder and view-finder including optical elements positioned between said auxiliary objectives and said composite prism element for increasing the optical path length between said auxiliary objectives and said first image plane with respect to the optical path length therebetween in air, and a positive lens constituting an auxiliary objective with respect to said camera objective located on the optic axis of said camera objective between the latter and said composite prism element.

References Cited in the file of this patent

UNITED STATES PATENTS

| | | |
|---|---|---|
| 2,341,410 | Mihalyi | Feb. 8, 1944 |
| 2,352,644 | Linderman et al. | July 4, 1944 |
| 2,364,652 | Pollock | Dec. 12, 1944 |
| 2,887,019 | Dodin | May 19, 1959 |

FOREIGN PATENTS

| | | |
|---|---|---|
| 933,132 | Germany | Sept. 15, 1955 |